United States Patent
Zhang

(10) Patent No.: US 11,746,286 B2
(45) Date of Patent: Sep. 5, 2023

(54) CORE-SHELL TYPE QUANTUM DOT, PREPARATION METHOD AND USE THEREOF

(71) Applicant: BOE TECHNOLOGY GROUP CO., LTD., Beijing (CN)

(72) Inventor: Aidi Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 864 days.

(21) Appl. No.: 16/640,172

(22) PCT Filed: May 28, 2019

(86) PCT No.: PCT/CN2019/088726
§ 371 (c)(1),
(2) Date: Feb. 19, 2020

(87) PCT Pub. No.: WO2020/010938
PCT Pub. Date: Jan. 16, 2020

(65) Prior Publication Data
US 2021/0130683 A1  May 6, 2021
US 2022/0025253 A9  Jan. 27, 2022

(30) Foreign Application Priority Data

Jul. 12, 2018 (CN) .......................... 201810764067.0

(51) Int. Cl.
C09K 11/88 (2006.01)
C09K 11/56 (2006.01)
(Continued)

(52) U.S. Cl.
CPC ............ *C09K 11/025* (2013.01); *C01B 17/98* (2013.01); *C01B 19/04* (2013.01); *C09K 11/565* (2013.01);
(Continued)

(58) Field of Classification Search
CPC ..... C09K 11/025; C09K 11/565; C09K 11/616; C09K 11/883
See application file for complete search history.

(56) References Cited

U.S. PATENT DOCUMENTS

2009/0169861 A1    7/2009  Nie et al.
2017/0167693 A1*   6/2017  Yamazumi ............. C09K 11/08

FOREIGN PATENT DOCUMENTS

CN    102648536 A    8/2012
CN    102668143 A    9/2012
(Continued)

OTHER PUBLICATIONS

Amjadi. Molecularly imprinted mesoporous silica embedded with carbon dots and semiconductor quantum dots as a ratiometric fluorescent sensor for diniconazole. Biosensors and Bioelectronics vol. 96, Oct. 15, 2017, pp. 121-126 (Year: 2017).*
(Continued)

*Primary Examiner* — Matthew E. Hoban
(74) *Attorney, Agent, or Firm* — Armstrong Teasdale LLP

(57) ABSTRACT

The present disclosure relates to a core-shell type quantum dot, comprising a quantum dot core, a light-transmitting inorganic mesoporous material layer on a surface of the quantum dot core, and a filler different from the inorganic mesoporous material in mesopores of the light-transmitting inorganic mesoporous material layer. The present disclosure also relates to the preparation and use of the core-shell type quantum dot core. The quantum dot core is coated with the light-transmitting inorganic mesoporous material and the mesopores of the inorganic mesoporous material are filled with the filler different from the inorganic mesoporous material, and the core-shell type quantum dots thus obtained not only have improved optical stability and chemical stability, but also have adjustable optical properties.

12 Claims, 4 Drawing Sheets

(51) Int. Cl.
| | |
|---|---|
| C09K 11/61 | (2006.01) |
| C09K 11/02 | (2006.01) |
| C01B 17/98 | (2006.01) |
| C01B 19/04 | (2006.01) |
| B82Y 20/00 | (2011.01) |
| B82Y 30/00 | (2011.01) |
| B82Y 40/00 | (2011.01) |

(52) U.S. Cl.
CPC .......... *C09K 11/616* (2013.01); *C09K 11/883* (2013.01); *B82Y 20/00* (2013.01); *B82Y 30/00* (2013.01); *B82Y 40/00* (2013.01); *C01P 2004/64* (2013.01); *C01P 2006/16* (2013.01)

(56) References Cited

FOREIGN PATENT DOCUMENTS

| | | | |
|---|---|---|---|
| CN | 103018231 A | | 4/2013 |
| CN | 104592996 A | | 5/2015 |
| CN | 104646033 A | | 5/2015 |
| CN | 105051152 A | | 11/2015 |
| CN | 105056233 A | | 11/2015 |
| CN | 105073946 A | | 11/2015 |
| CN | 106221693 A | | 12/2016 |
| CN | 107469078 | * | 7/2017 |
| CN | 107055553 A | | 8/2017 |
| CN | 107412195 A | | 12/2017 |
| CN | 107469078 A | | 12/2017 |
| CN | 107541203 A | | 1/2018 |
| CN | 107541208 A | | 1/2018 |
| CN | 108624317 A | | 10/2018 |

OTHER PUBLICATIONS

Wang. Two-photon upconversion luminescence of CdTe quantum dots in silicate glasses irradiated by an infrared femtosecond laser. vol. 8, No. 6 | Jun. 1, 2018 | Optical Materials Express 1484 (Year: 2018).*

PCT International Search Report, Application No. PCT/CN2019/088726, dated Aug. 30, 2019, 5 pages: with English translation.
PCT Written Opinion, Application No. PCT/CN2019/088726, dated Aug. 30, 2019, 6 pages : with English translation of relevant part.
China First Office Action, Application No. 201810764067.0, dated Jul. 15, 2019, 19 pps.: with English translation.
China Second Office Action, Application No. 201810764067.0, dated Oct. 10, 2019, 13 pps.: with English translation.
China Third Office Action, Application No. 201810764067.0, dated Mar. 4, 2020, 13 pps.: with English translation.
China Rejection Decision, Application No. 201810764067.0, dated Jul. 10, 2020, 10 pps.: with English translation.
Li Yang, "The Application of Fluorescence Biosensors Based on Quantum Dots@SiO2 Microspheres", Full-text Database of China Excellent Master's Thesis, Engineering Science and Technology I, publication date: Dec. 15, 2016, pp. 40-51: with English translation of relevant part.
Jianping Yang et al., "Mesoporous Silica Encaplulating Upconversion Luminescence Rare-Earth Fluoride Nanorods for Secondary Excitation", Langmuir, vol. 26, No. 11, Feb. 2, 2010, pp. 8850-8856.
Ping Yang et al. "Highly Luminescent CdSe/CdxZn1-xS Quantum Dots Coated with Thickness-Controlled SiO2 Shell through Silanization", Langmuir, vol. 27, No. 15, Jul. 6, 2011, pp. 9535-9540.
Daniele Gerion et al., "Synthesis and Properties of Biocompatible Water-Soluble Silica-Coated CdSe/ZnS Semiconductor Quantum Dots", J. Phys. Chem. B, vol. 105, No. 37, Apr. 17, 2001, pp. 8861-8871.
Pinhua Rao et al., "Highly stable CuInS2@ZnS:Al core@shell quantum dots: the role of aluminium self-passivation", Chemical Communications, 51, 2015, pp. 8757-8760.
Botao Ji et al., "Non-blinking quantum dot with a plasmonic nanoshell resonator", Nature Nanotechnology, 10, Jan. 12, 2015, pp. 170-175.
Young-Kuk Kim et al., "Enhanced luminescence stability of quantum dot-based inorganic nanocomposite particles for white-light-emitting diodes", Materials Letters, 124, 2014, pp. 129-132.
Ning Liu et al., "Photoluminescence properties of hybrid SiO2-coated CdTe/CdSe quantum dots", Luminescence, 29, 2013, pp. 566-572.

* cited by examiner

CORE-SHELL TYPE QUANTUM DOT, PREPARATION METHOD AND USE THEREOF

CROSS REFERENCE TO RELATED APPLICATIONS

This patent application is a National Stage Entry of PCT/CN2019/088726 filed on May 28, 2019, which claims the benefit and priority of Chinese Patent Application No. 201810764067.0 filed on Jul. 12, 2018, the disclosures of which are incorporated by reference herein in their entirety as part of the present application.

BACKGROUND

The present disclosure relates to the field of display technology, and more particularly, to a core-shell type quantum dot, a preparation method and use thereof.

Semiconductor quantum dot (commonly referred to as semiconductor nanocrystal or quantum dot for short) is an important inorganic nano fluorescent material. Since the discovery of quantum dot, it has attracted wide attention due to its special structure that imparts excellent optoelectronic properties. One of the most outstanding properties of quantum dot is the "fluorescence performance", which has the characteristics of wide excitation spectrum range, narrow fluorescence emission spectrum, good light stability, long fluorescence lifetime, and the like. Therefore, the quantum dot has wide application prospects. Among them, quantum dot photodiode has attracted widespread research attention in academia and industry, and is expected to become the next generation of panel display and solid-state light source with low cost and high efficiency.

However, since the size of the quantum dots is mostly 3 to 10 nm, the specific surface area is very large, and it is easy to interact with oxygen and water in the air during use, and various defects are formed on the surface of the quantum dots. The fluorescence intensity will gradually weaken or quench under constant light, which poses a great limitation to the long-term use of devices prepared using quantum dots (Nature Nanotechnology, 2015, 10, 170-175; Chemical Communications, 2015, 51, 8757-8760). Therefore, if fluorescent quantum dots are to be widely used in industry, quantum dots need to have good light and chemical stability. This requires isolation of the fluorescent quantum dots from the external environment.

The fluorescence intensity of a quantum dot depends largely on its surface ligand. The interaction between the surface ligand and the external environment usually results in the shedding or oxidation of the ligand, which in turn causes the fluorescence intensity of the quantum dot to decrease or quench.

At this stage, there are mainly the following ways to improve the stability of quantum dots: (1) preparing core-shell quantum dots; (2) encapsulating a material such as silicon dioxide or a polymer to enhance the stability of quantum dots; and (3) preparing passivation element-doped quantum dots. At present, it has been proved that the introduction of a high molecular polymer or silicon dioxide shell can enhance the fluorescence stability of quantum dots to a certain extent (J. Phys. Chem. B, 2001, 105, 8861-8871; Langmuir, 2011, 27 (15), 9535-9540). However, the polymer material coated on the surface of the quantum dots has an open structure, which can directly contact the external water and oxygen. Silicon dioxide has a semi-dense structure that can only partially isolate the moisture and oxygen in the external environment (Luminescence, 2013, 29, 566-572; Materials Letters, 2014, 124, 129-132). Because silicon dioxide has a mesoporous structure (a porous structure with a pore diameter between 2 to 50 nm), external air and moisture can still interact with the ligands on the surface of the quantum dots through the mesoporous channels during long-term use, resulting in a decrease in their fluorescence intensity.

BRIEF DESCRIPTION

A first aspect of the present disclosure provides a core-shell type quantum dot with improved optical and chemical stability, which includes a quantum dot core, a light-transmitting inorganic mesoporous material layer on a surface of the quantum dot core, and a filler different from the inorganic mesoporous material in mesopores of the light-transmitting inorganic mesoporous material layer.

Optionally, the filler is fixed in the mesopores by chemical bonding.

Optionally, the core-shell type quantum dot further includes a light-transmitting metal oxide passivation layer on a surface of the light-transmitting inorganic mesoporous material layer away from the quantum dot core.

Optionally, the filler is a fluorescent responsive substance.

Optionally, wherein the fluorescent responsive substance is one or more selected from the group consisting of: a) an upconversion nanoparticle; b) a fluorescent dye; and c) a self-luminous material used in OLED devices not used for a) and b).

Optionally, the fluorescent responsive substance is one or more selected from the group consisting of $NaYF_4$, $NaLuF_4$, $NaGdF_4$, $NaYbF_4$ nanoparticles, $NaYF_4$, $NaLuF_4$, $NaGdF_4$, $NaYbF_4$ nanoparticles doped with one or more rare earth ions selected from $Yb^{3+}$, $Er^{3+}$, $Tm^{3+}$, and $Ho^{3+}$, fluorescein isothiocyanic acid, phycoerythrin, AlexaFluor series dyes, rhodamine series dyes, and compounds and conjugated polymers containing a benzene ring or a heterocyclic ring and conjugated double bonds.

Optionally, the oxide constituting the light-transmitting metal oxide passivation layer is one or more substances selected from the group consisting of aluminum oxide, magnesium oxide, zinc oxide, magnesium aluminum oxide, zinc aluminum oxide, and magnesium zinc oxide.

Optionally, the thickness of the light-transmitting inorganic mesoporous material layer is about 2 to 50 nm, and/or, the thickness of the light-transmitting metal oxide passivation layer is about 1 to 10 nm, and/or, the total coating thickness of the quantum dot core is about 3 to 60 nm.

A second aspect of the present disclosure provides a method for preparing the core-shell type quantum dot of the present disclosure, including:

a) introducing a light-transmitting inorganic mesoporous material layer on the surface of the quantum dot core to obtain quantum dot core/inorganic mesoporous material composite particles; and b) introducing a filler different from the inorganic mesoporous material into mesopores of the inorganic mesoporous material layer of the quantum dot core/inorganic mesoporous material composite particles obtained in step a) to obtain quantum dot core/inorganic mesoporous material/filler composite particles.

Optionally, step b) includes steps 2)-4):

2) modifying mesoporous channels of the inorganic mesoporous material layer of the quantum dot core/inorganic mesoporous material composite particles obtained in step a) with a compound containing functional group X to obtain functional group X-modified quantum dot core/inorganic mesoporous material composite particles;

3) modifying the filler different from the inorganic mesoporous material with a compound containing functional group Y to obtain a functional group Y-modified filler, wherein the functional group X and the functional group Y are reactive with each other; and 4) contacting the functional group X-modified quantum dot core/inorganic mesoporous material composite particles obtained in step 2) with the functional group Y-modified filler obtained in step 3), thus reacting the functional group X with the functional group Y to obtain quantum dot core/inorganic mesoporous material/filler composite particles.

Optionally, the method further includes the following step:

c) coating the surface of the quantum dot core/inorganic mesoporous material/filler composite particles obtained in step b) or step 4) with a light-transmitting metal oxide passivation layer.

Optionally, when the functional group X is conjugated double bonds or a three-atom-four-electron conjugated system moiety, the functional group Y is a carbon-carbon double bond, a derivative of carbon-carbon double bond structure, a carbon-carbon triple bond, or a derivative of carbon-carbon triple bond structure; when the functional group X is a mercapto group, the functional group Y is a carbon-carbon double bond or a derivative of carbon-carbon double bond structure.

Optionally, wherein the compound containing functional group X used in step 2) and the compound containing functional group Y used in step 3) are compounds capable of undergoing Diels-Alder reaction, thio-ene reaction, or Huisgen cycloaddition reaction with each other.

Optionally, wherein the compound containing functional group X used in step 2) and the compound containing functional group Y used in step 3) are each as follows:

1) the compound containing functional group X used in step 2) is a conjugated diene compound capable of undergoing Diels-Alder addition reaction, and the compound containing functional group Y used in step 3) is a dienophile compound capable of undergoing Diels-Alder addition reaction;

2) the compound containing functional group X used in step 2) is a thiol compound capable of undergoing thio-ene addition reaction, and the compound containing functional group Y used in step 3) is a compound containing a carbon-carbon double bond capable of undergoing thio-ene addition reaction; and 3) the compound containing functional group X used in step 2) is a 1,3-dipole capable of undergoing Huisgen cycloaddition reaction, and the compound containing functional group Y used in step 3) is an alkene, an alkyne or a derivative thereof capable of undergoing Huisgen cycloaddition reaction.

A third aspect of the present disclosure provides use of the core-shell type quantum dot of the present disclosure, including use of the core-shell type quantum dot in LEDs, solar cells, biomarkers, bioimaging, displays, single particle tracking, single particle solid-state lasers, and single photon emitters.

A fourth aspect of the present disclosure provides use of the core-shell type quantum dot of the present disclosure, including use in the preparation of a semiconductor device, a quantum dot display device, a light emitting device, a magnetic induction and fluorescent induction device, a gene and drug carrier, a biosensor, a nuclear magnetic resonance contrast agent, and an imaging agent.

A fifth aspect of the present disclosure provides a device including the core-shell type quantum dot of the present disclosure, including a semiconductor device, a quantum dot display device, a light emitting device, a magnetic induction and fluorescent induction device, a gene and drug carrier, a biosensor, a nuclear magnetic resonance contrast agent, and an imaging agent.

DETAILED DESCRIPTION

Figure 1:
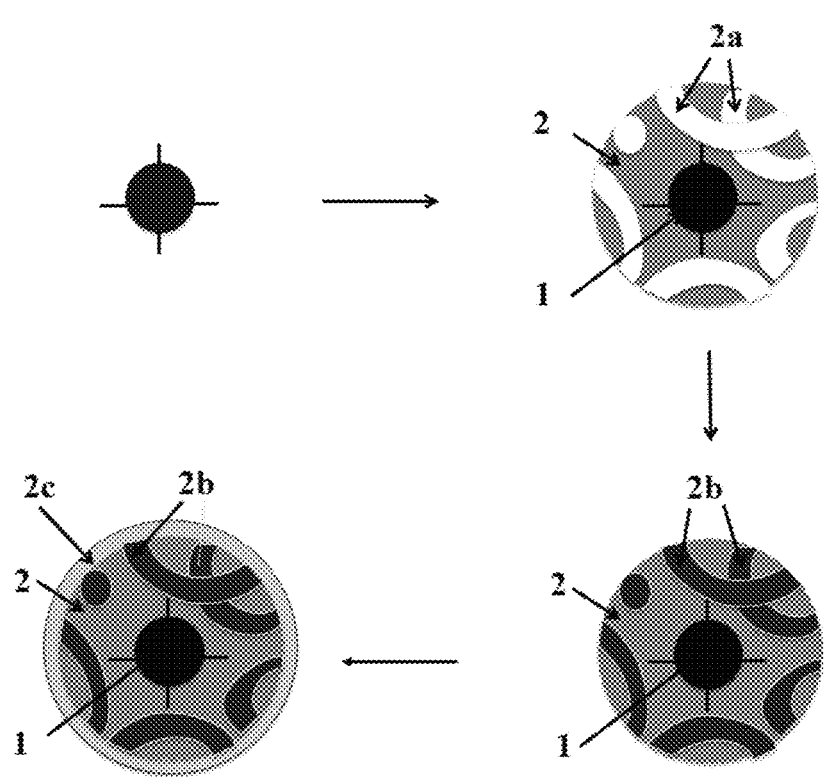
FIG. 1 is a schematic flowchart of a core-shell type quantum dot and a preparation method thereof covered by the present disclosure, wherein
    1—quantum dot core;
    2—inorganic mesoporous material layer;
    2a—mesopore channel;
    2b—filler; and
    2c—passivation layer.

The inventors of the present disclosure have conducted extensive and in-depth research on improving the stability of quantum dots, in hope of discovering a core-shell type quantum dot with better optical stability and chemical stability, and a preparation method thereof. The inventors of the present disclosure have discovered that the quantum dot cores are coated with a light-transmitting inorganic mesoporous material and the mesopores are filled with a filler different from the inorganic mesoporous material, and the core-shell type quantum dots thus obtained have improved optical stability and chemical stability. The present disclosure has been achieved based on the foregoing findings.

A first aspect of the present disclosure provides a core-shell type quantum dot including a quantum dot core and a light-transmitting inorganic mesoporous material layer on a surface of the quantum dot core and a filler different from the inorganic mesoporous material in mesopores of the light-transmitting inorganic mesoporous material layer.

In the present disclosure, firstly, by coating the surface of a quantum dot core with a layer of light-transmitting inorganic mesoporous material as a protective layer, this achieves a preliminary isolation of the quantum dot from the external environment. Secondly, mesoporous channels of the light-transmitting inorganic mesoporous material layer are filled and closed with a filler different from the inorganic mesoporous material to form a manner of "pinning", which realizes further isolation of the quantum dot core from external moisture and oxygen, thereby improving optical stability and chemical stability.

A variety of beneficial effects can be obtained by selecting a light-transmitting inorganic mesoporous material to be introduced outside the quantum dot core as a shell layer, and filling the mesoporous channels with a filler different from the inorganic mesoporous material, specifically, (1) After the mesopores of the mesoporous material are filled with the filler different from the inorganic mesoporous material, the filler and the mesoporous material are regarded as heterogeneous materials, and the difference in the local pore diameters will cause a slight difference in the local densities thereof. Specifically, during the process of forming mesoporous channels, the experimental conditions inherently cause the channels to be non-uniform and the pore diameters have a certain distribution, that is, the pore diameter distribution is between about 2 to 50 nm. Therefore, during the subsequent introduction of the filler, the filling rate and the filling amount of the filler will be different. Finally, the filler is unevenly distributed in the mesoporous channels. In the composite heterostructure formed by the mesoporous shell material and the filler, the uneven distribution of the filler will result in the different density of the composite in the local micro region. At last, various rough structures will be formed at the interface between the inner wall material of the mesopores and the filler.

(2) The rough structure can change the optical properties of the quantum dot core. Due to the diffuse reflection of light on the rough surface, the rougher the surface is, the weaker its reflective ability is, so more excitation light can pass through the rough structure to excite the quantum dots, so that the quantum dots get more excitation light under the condition that the total energy of the incident light is unchanged. More incident light excites the quantum dots, which can cause the quantum dots to produce more emitted light.

(3) When filling the mesoporous channels with a filler having a different emission wavelength than the quantum dot core, such as a fluorescent responsive substance (for example, upconversion nanoparticles, fluorescent dyes, other self-luminous materials used in OLED devices, such as compounds and conjugated polymers containing a benzene ring or a heterocyclic ring and conjugated double bonds, etc.), the wavelength of light emitted by the nano-composite structure can be finally changed. In the present disclosure, for example, when the emission light of the quantum dot core is fixed at 470 nm, Rhodamine 6G emitting green light (530 nm) is selected as the filled fluorescently responsive substance, then the nano-composite structure finally emits a composite color light (cyan light) of blue light and green light. For another example, when the emission light of the quantum dot core is fixed at 470 nm, and CdSe quantum dot emitting red light (620 nm) is selected as the filled fluorescently responsive substance, then the nano-composite structure finally emits a composite color light (purple light) of blue light and red light.

The core-shell type quantum dot of the present disclosure has a core-shell structure composed of a quantum dot core and a coating material coating the quantum dot core as a shell. In the present disclosure, there is no particular limitation on the type of the quantum dot core, and any quantum dot core may be adopted. The quantum dot core may be a binary structure quantum dot core, a ternary structure quantum dot core, a quaternary structure quantum dot core, a multi-doped structure quantum dot core or any combination thereof. The binary structure quantum dot core that can be used in the present disclosure can be expressed as AX, where A is cadmium, zinc, mercury, lead, tin, gallium, indium, calcium, barium, or copper, and X is sulfur, selenium, nitrogen, phosphorus, arsenic, tellurium, or antimony. The ternary structure quantum dot core that can be used in the present disclosure can be expressed as A1A2X, where A1 and A2 are different and independently selected from the group consisting of cadmium, zinc, mercury, lead, tin, gallium, indium, calcium, barium, and copper, and X is sulfur, selenium, nitrogen, phosphorus, arsenic, tellurium, or antimony. The quaternary structure quantum dot core that can be used in the present disclosure can be represented as A1A2A3X, where A1, A2, and A3 are different and independently selected from the group consisting of cadmium, zinc, mercury, lead, tin, gallium, indium, calcium, barium, and copper, and X is sulfur, selenium, nitrogen, phosphorus, arsenic, tellurium, or antimony. The multi-doped structure quantum dot cores that can be used in the present disclosure can be expressed as Y-doped A1A2A3, where Y is copper, manganese, zinc, silver, gold, cobalt, yttrium, zirconium, lanthanum, praseodymium, neodymium, praseodymium, or the like, A1, A2, and A3 are different and independently selected from the group consisting of cadmium, zinc, mercury, lead, tin, gallium, indium, calcium, barium, and copper.

For example, the quantum dot core that can be used in the present disclosure can be CdTe, CdS, CdSe, ZnSe, InP, CuInS, CuInSe, PbS, CdS/ZnS, CdSe/ZnS, CdSe/ZnSeS, CdSe/CdS, ZnSe/ZnS, InP/ZnS, CuInS/ZnS, (Zn)CuInS/ZnS, (Mn)CuInS/ZnS, AgInS/ZnS, (Zn)AgInS/ZnS, CuInSe/ZnS, CuInSeS/ZnS, PbS/ZnS, $CsPbCl_3$/ZnS, $CsPbBr_3$/ZnS, $CsPbI_3$/ZnS, and organic-inorganic perovskite quantum dots ($MAPbX_3$, MA=$CH_3NH_3$, X=Cl, Br, I), all-inorganic perovskite quantum dots ($CsPbX_3$, X=Cl, Br, I), and the like, carbon quantum dot, silicon quantum dot.

In the present disclosure, the inorganic mesoporous material constituting the light-transmitting inorganic mesoporous material layer is generally one or more selected from the group consisting of mesoporous silicon dioxide, mesoporous titanium dioxide, mesoporous silicoaluminophosphate, and mesoporous cobalt tetroxide and the like. The inorganic mesoporous material may be mesoporous silicon dioxide.

In the present disclosure, the mesoporous channels are filled with a filler different from the inorganic mesoporous material. The filler can be physically placed in the mesoporous channels, or it can be fixed in the mesopores by chemical bonding. In an example embodiment of the present disclosure, the filler different from the inorganic mesoporous material is fixed in the mesopores chemical bonding. The said filler being fixed in the mesopores by chemical bonding means that the filler is bound to the inner wall material of the mesopore through a chemical bond. This bonding method is very stable, so that the filler is permanently fixed in the mesopores and does not move or escape with time, thereby permanently isolating the quantum dot core from the outside environment.

In the present disclosure, the filler different from the inorganic mesoporous material may be any material capable of filling the mesopores of the inorganic mesoporous material layer, and may be organic, inorganic, or any mixture thereof. For example, the filler may be an inorganic substance, such as aluminum trioxide, aluminosilicate, magnesium oxide, and zinc oxide, and may be an organic substance, such as rhodamine B dye, rhodamine 6G dye, and rhodamine 123 dye.

In an example embodiment of the present disclosure, the filler different from the inorganic mesoporous material is a fluorescent responsive substance. In the present disclosure, a fluorescent responsive substance (also referred to as a fluorescent active substance) means that the substance can absorb the energy of the incident light after being excited by the incident light, and then convert the absorbed incident light energy into emission light of other wavelengths, and the like. Such substances include upconversion nanoparticles, fluorescent dyes (especially organic fluorescent dyes), self-luminous materials such as other compounds and conjugated polymers containing a benzene ring or a heterocyclic ring and conjugated double bonds used in OLED devices.

As the fluorescent responsive substance of the present disclosure, it may be one or more selected from the group consisting of:

a) upconversion nanoparticles, such as $NaYF_4$, $NaLuF_4$, $NaGdF_4$, and $NaYbF_4$ nanoparticles, and $NaYF_4$, $NaLuF_4$, $NaGdF_4$, and $NaYbF_4$ nanoparticles doped with one or more rare earth ions selected from $Yb^{3+}$, $Er^{3+}$, $Tm^{3+}$, and $Ho^{3+}$;

b) fluorescent dyes, such as fluorescein isothiocyanic acid, phycoerythrin, and AlexaFluor series dyes (such as Alexa Fluor 350, Alexa Fluor 405, Alexa Fluor 430, Alexa Fluor 488, Alexa Fluor 532, Alexa Fluor 546, Alexa Fluor 555, Alexa Fluor 568, Alexa Fluor 594, Alexa Fluor 610, Alexa Fluor 633, Alexa Fluor 635, Alexa Fluor 647, Alexa Fluor 680, Alexa Fluor 700, Alexa Fluor 750, and the like) and Rhodamine series dyes (such as Rhodamine B, Rhodamine 6G, Rhodamine 123, and the like); and c) self-luminous materials different from a) and b) used in OLED devices, such as compounds and conjugated polymers containing a benzene ring or a heterocyclic ring and conjugated double bonds, such as polybenzene, polythiophene, polyfluorene, polytriphenylamine and derivatives thereof, as well as polytriphenylamine, polycarbazole, polypyrrole, polyporphyrin and derivatives and copolymers thereof.

In the present disclosure, after the quantum dot core is coated with a light-transmitting inorganic mesoporous material, the thickness of the light-transmitting inorganic mesoporous material coating layer is usually 2 to 50 nm, preferably 2 to 10 nm.

In another example embodiment of the present disclosure, the core-shell type quantum dot further includes a light-transmitting metal oxide passivation layer on a surface of the inorganic mesoporous material layer away from the quantum dot core. At this time, the structure diagram of the core-shell type quantum dot according to the present disclosure is shown in the lower left diagram in FIG. 1, wherein the most central part is a quantum dot core 1, an inorganic mesoporous material layer 2 is outside the quantum dot core 1 and contains mesoporous channels 2a, the mesopores are filled with a filler 2b, and a surface of the inorganic mesoporous material layer 2 away from the quantum dot core 1 is further coated with a passivation layer 2c.

The metal oxide passivation layer completely isolates the quantum dot core from the outside environment, and further improves the optical stability and chemical stability of the quantum dot, thereby extending the lifetime and service life of the quantum dot. In the present disclosure, any metal oxide capable of forming a light-transmitting, dense, uniform passivation layer on the surface of the quantum dot core can be used in the passivation layer. In one embodiment of the present disclosure, the oxide constituting the light-transmitting metal oxide passivation layer is one or more substances selected from the group consisting of aluminum oxide, magnesium oxide, zinc oxide, magnesium aluminum oxide, zinc aluminum oxide and magnesium zinc oxide, preferably aluminum oxide. The thickness of the light-transmitting metal oxide passivation layer is usually about 1 to 10 nm, may be about 1 to 5 nm. At this time, the total coating thickness of the quantum dot core is usually about 3 to 60 nm. In the present disclosure, the total coating thickness of the quantum dot core refers to the total thickness of all coating layers of the core-shell type quantum dot except the quantum dot core.

In a particularly example embodiment of the present disclosure, the core-shell type quantum dot includes a light-transmitting metal oxide passivation layer on a surface of the inorganic mesoporous material layer away from the quantum dot core, wherein the inorganic mesoporous material is silicon dioxide, the filler is an organic fluorescent dye, and the oxide constituting the light-transmitting metal oxide passivation layer is aluminum oxide.

A second aspect of the present disclosure provides a method for preparing the core-shell type quantum dot of the present disclosure, including:

a) introducing a light-transmitting inorganic mesoporous material layer on the surface of the quantum dot core to obtain quantum dot core/inorganic mesoporous material composite particles; and b) introducing a filler different from the inorganic mesoporous material into mesopores of the inorganic mesoporous material layer of the quantum dot core/inorganic mesoporous material composite particles obtained in step a) to obtain quantum dot core/inorganic mesoporous material/filler composite particles.

In step a), a layer of the light-transmitting inorganic mesoporous material is introduced on the surface of the quantum dot core to obtain quantum dot core/inorganic mesoporous material composite particles. This is usually achieved by hydrolyzing a precursor of the inorganic mesoporous material under the action of a catalyst (such as alkali liquor). When the inorganic mesoporous material is silicon dioxide, its precursor may be a silane reagent, such as tetraethyl orthosilicate, methyl orthosilicate, butyl orthosilicate; when the inorganic mesoporous material is titanium dioxide, its precursor may be titanium sulfate; when the inorganic mesoporous material is cobalt tetroxide, its precursor may be cobalt nitrate hexahydrate; when the inorganic mesoporous material is a mesoporous silicoaluminophosphate, its precursor may be an aluminophosphate-based molecular sieve.

For example, in a hydrosol of CdSe/ZnS fluorescent quantum dots, tetraethyl orthosilicate is added and a small amount of ammonia or other alkaline solution is added, and it is stirred until a mesoporous silicon dioxide shell is formed on the surface of the CdSe/ZnS fluorescent quantum dot. By controlling the amounts of tetraethyl orthosilicate and the alkaline solution, the thickness of the silicon dioxide shell can be adjusted.

In step b), the filler different from the inorganic mesoporous material may be physically placed in the mesoporous channel, or may be connected to the inner wall of the mesoporous channel by chemical bonding. In order to chemically bond the filler to the inner wall of the mesoporous channel, the first method is to use a small molecule linker (carbodiimide (EDC) and/or N-hydroxysuccinimide (NHS)). The second method is to modify the inner wall of the mesoporous channel and the filler with two small molecule compounds capable of undergoing an addition reaction with each other, respectively, and then undergo the addition reaction to achieve chemical connection.

Therefore, in a particularly example embodiment of the present disclosure, step b) includes steps 2)-4):

2) modifying mesoporous channels of the inorganic mesoporous material layer of the quantum dot core/inorganic mesoporous material composite particles obtained in step a) with a compound containing functional group X to obtain functional group X-modified quantum dot core/inorganic mesoporous material composite particles;

3) modifying the filler different from the inorganic mesoporous material with a compound containing functional group Y to obtain a functional group Y-modified filler, wherein the functional group X and the functional group Y are reactive with each other; and 4) contacting the functional group X-modified quantum dot core/inorganic mesoporous material composite particles obtained in step 2) with the functional group Y-modified filler obtained in step 3), thus reacting the functional group X with the functional group Y to obtain quantum dot core/inorganic mesoporous material/filler composite particles.

In step 2), the mesoporous channels are modified with the compound containing functional group X to obtain the functional group X-modified quantum dot core/inorganic mesoporous material composite particles. The functional group X here may be a mercapto group, an amino group, a carboxyl group, conjugated double bonds (expressed as —C=C—C=C—), a three-atom-four-electron conjugated system moiety (1,3-dipolar compound), and the like. This can be performed by contacting a solution of the compound containing functional group X with the quantum dot core/inorganic mesoporous material composite particles.

In step 3), the filler different from the inorganic mesoporous material is modified with the compound containing functional group Y to obtain the functional group-Y modified filler, in which the functional group X and the functional group Y are reactive with each other. The functional group Y here may be a carbon-carbon double bond, a derivative of carbon-carbon double bond structure, a carbon-carbon triple bond, or a derivative of carbon-carbon triple bond structure. This can be performed by contacting a solution of the compound containing functional group Y with the filler different from the inorganic mesoporous material.

The functional group X and the functional group Y are reactive with each other. Therefore, in one embodiment of the present disclosure, when the functional group X is conjugated double bonds or a three-atom-four-electron conjugated system moiety, the functional group Y may be a carbon-carbon double bond, a derivative of carbon-carbon double bond structure, a carbon-carbon triple bond or a derivative of carbon-carbon triple bond structure; when the functional group X is a mercapto group, the functional group Y may be a carbon-carbon double bond or a derivative of carbon-carbon double bond structure.

In the present disclosure, the derivative of carbon-carbon double bond structure generally refers to those carbon-carbon double bond derivatives in which one or more hydrogens on the carbon-carbon double bond are replaced by other groups such as halogen, alkyl, haloalkyl, alkoxy, haloalkoxy, hydroxyl, carboxyl, ester, and the like. The derivative of carbon-carbon triple bond structure generally refers to those carbon-carbon triple bond derivatives in which one or more hydrogens on the carbon-carbon triple bond are replaced by other groups such as halogen, alkyl, haloalkyl, alkoxy, haloalkoxy, hydroxyl, carboxyl, ester, and the like.

In an example embodiment of the present disclosure, the compound containing functional group X used in step 2) and the compound containing functional group Y used in step 3) are compounds capable of undergoing Diels-Alder reaction, thio-ene reaction, or Huisgen cycloaddition reaction with each other.

In a particularly preferred embodiment of the present disclosure, the compound containing functional group X used in step 2) and the compound containing functional group Y used in step 3) are each as follows:

1) the compound containing functional group X used in step 2) is a conjugated diene compound capable of undergoing Diels-Alder addition reaction, such as 1,3-butadiene and its derivatives, isoprene, cyclopentadiene, and any mixture thereof, and the compound containing functional group Y used in step 3) is a dienophile compound capable of undergoing Diels-Alder addition reaction, such as ethylene, butene, acetylene, methyl acrylate, ethyl acrylate, or any mixture thereof;

2) the compound containing functional group X used in step 2) is a thiol compound capable of undergoing thio-ene addition reaction, such as octyl mercaptan, dodecyl mercaptan, cetyl mercaptan, octadecyl mercaptan, cysteamine, 2-mercaptoimidazole, (3-mercaptopropyl) trimethoxysilane or any mixture thereof, and the compound containing functional group Y used in step 3) is a compound containing a carbon-carbon double bond capable of undergoing thio-ene addition reaction, such as methyl acrylate, methyl acrylate, ethylene, propylene, butene, 1-hexene, 2-ethyl-4-methyl-1-hexene, cyclobutadiene, cyclopentadiene, propadiene, vinyl alcohol, butenol or any mixture thereof and 3) the compound containing functional group X used in step 2) is a 1,3-dipole capable of undergoing Huisgen cycloaddition reaction, such as nitrone, catalytic nitrogen-arylmethylenephenylamine oxide, 1-benzyl-3,5-bisarylmethylenepiperidin-4-one, nitrile oxide (R-CNO), or any mixture thereof, and the compound containing functional group Y used in step 3) is an alkene, an alkyne or a derivative thereof capable of undergoing Huisgen cycloaddition reaction, such as ethylene, butene, acetylene, methyl acrylate, ethyl acrylate, or any mixture thereof.

In step 4), the functional group X modified quantum dot core/inorganic mesoporous material composite particles obtained in step 2) are brought into contact with the functional group Y modified filler obtained in step 3), so that the functional group X is reacted with the functional group Y to obtain the quantum dot core/inorganic mesoporous material/filler composite particles. The reaction can usually be achieved by irradiating with a UV lamp for a period of time, thereby achieving an addition reaction between the functional groups X and Y. For this reason, the two are usually mixed and stirred uniformly. The stirring can be performed by means of mechanical stirring, magnetic stirring or ultrasound.

In a particularly example embodiment of the present disclosure, the compound containing functional group X used in step 2) is (3-mercaptopropyl) trimethoxysilane, and the compound containing functional group Y used in step 3) is methyl acrylate, ethyl acrylate, or any mixture thereof.

For example, a certain amount of 3-(mercaptopropyl) trimethoxysilane solution is added to the reaction sol obtained in step a), and the mixture is stirred and mixed uniformly under heating or room temperature to obtain a sol of thiol functional group modified quantum dot/inorganic mesoporous material nanocomposite particles. In addition, methyl acrylate is mixed and stirred with an aqueous solution of a filler (such as an organic fluorescent dye molecule) to obtain a methyl acrylate-treated filler (such as an organic fluorescent dye) solution. Finally, a hydrosol of thiol functional group-modified quantum dot/inorganic mesoporous material nanocomposite particles is mixed with the methyl acrylate-treated filler (such as an organic fluorescent dye) solution, and cured under the irradiation of 320 to 360 nm ultraviolet light to undergo the click chemical addition reaction of thiol and alkene, so that the filler (such as organic fluorescent dye molecules) can be firmly bound to the inner walls of the mesoporous channels.

In a particularly example embodiment of the preparation method of the present disclosure, it further includes step c): coating the surface of the quantum dot core/inorganic mesoporous material/filler composite particles obtained in step b) or step 4) with a light-transmitting metal oxide passivation layer. The process of the preparation method is shown in FIG. 1. In order to coat the light-transmitting metal oxide passivation layer, an aqueous solution of a soluble precursor compound (e.g. aluminosilicate, magnesium silicate salt, or aluminum-containing hydrochloride, or magnesium-containing hydrochloride, aluminum sulfate, or magnesium sulfate, or a mixture of aluminum sulfate and magnesium sulfate) of an inorganic metal oxide or a composite oxide thereof (e.g. aluminum oxide, magnesium oxide, zinc oxide, magnesium aluminum oxide, zinc aluminum oxide and zinc magnesium oxide) is usually hydrolyzed under alkaline conditions, thereby depositing the light-transmitting metal oxide passivation layer on the surface of the quantum dot core/inorganic mesoporous material/filler composite particles.

For example, the operation of introducing the light-transmitting metal oxide passivation layer can be described as follows:

In a hydrosol of quantum dot core/inorganic mesoporous material/filler composite particles, an aqueous solution of aluminosilicate as a precursor of aluminum oxide is added, and a small amount of ammonia is added, and the reaction is carried out under stirring at about 50 to 120° C., so that a light-transmitting aluminum oxide passivation layer is introduced onto the surface of the composite particles. The thickness of the light-transmitting aluminum oxide film can be controlled by controlling the amount of the precursor.

In the core-shell type quantum dot of the present disclosure and the core-shell type quantum dot prepared according to the method of the present disclosure, the quantum dot core is coated with a light-transmitting inorganic mesoporous material and the mesopores are filled with a filler different from the inorganic mesoporous material. Such a structure not only has improved optical stability and chemical stability, but also makes the optical performance of the quantum dot adjustable.

Therefore, a third aspect of the present disclosure provides use of the quantum dot of the present disclosure or the quantum dot prepared according to the method of the present disclosure in LEDs, solar cells, biomarkers, bioimaging, displays, single particle tracking, single particle solid-state lasers, and single photon emitters.

A third aspect of the present disclosure provides use of the quantum dot of the present disclosure or the quantum dot prepared according to the method of the present disclosure in the preparation of a semiconductor device, a quantum dot display device, a light emitting device, a magnetic induction and fluorescent induction device, a gene and drug carrier, a biosensor, a nuclear magnetic resonance contrast agent, and an imaging agent.

A final aspect of the present disclosure provides a semiconductor device, a quantum dot display device, a light emitting device, a magnetic induction and fluorescent induction device, a gene and drug carrier, a biosensor, a nuclear magnetic resonance contrast agent, and an imaging agent including the core-shell type quantum dot of the present disclosure or the quantum dot prepared according to the method of the present disclosure.

One aspect of the present disclosure provides an electroluminescent device including a light emitting layer including the quantum dot of the present disclosure or the quantum dot prepared according to the method of the present disclosure. The electroluminescent device is, for example, a quantum dot light emitting diode (QLED). The quantum dot light emitting diode is composed of multiple layers of thin films. For a quantum dot light emitting diode with an upright structure, its structure mainly includes the following layers, for example: anode, hole injection layer, hole transport layer, quantum dot light emitting layer, electron transport layer, and cathode. The quantum dot light emitting layer is located between the electron transport layer and the hole transport layer, and includes the core-shell type quantum dot of the present disclosure or the quantum dot prepared according to the method of the present disclosure. The quantum dot light emitting layer can be prepared by spin coating to obtain a thin film.

Another aspect of the present disclosure provides a photoluminescent device including a light emitting layer comprising the quantum dot of the present disclosure or the quantum dot prepared according to the method of the present disclosure. The photoluminescent device is, for example, a quantum dot color enhancement film. The quantum dot color enhancement film usually has a sandwich structure, mainly including a water-oxygen barrier film, a quantum dot layer, and a water-oxygen barrier film. The quantum dot layer is located between two layers of water-oxygen barrier film, and includes the core-shell type quantum dot of the present disclosure or the quantum dot prepared according to the method of the present disclosure, and a polymer as a dispersion matrix.

Another aspect of the present disclosure provides a quantum dot solar cell including a photoanode, a sensitizer, an electrolyte, and a counter electrode, wherein the sensitizer includes the core-shell type quantum dot of the present disclosure or the quantum dot prepared according to the method of the present disclosure. The function of the sensitizer is mainly used for light capture, charge separation and charge transfer.

Another aspect of the present disclosure provides a fluorescent probe connected to a gene and a drug carrier, and the fluorescent material of the fluorescent probe includes the core-shell type quantum dot of the present disclosure or the quantum dot prepared according to the method of the present disclosure.

EXAMPLES

The disclosure is further described below with reference to the examples, but the disclosure is not limited to the following examples.

The transmission electron microscope used in the present disclosure is a transmission electron microscope of model JEM-2100 manufactured by JEOL Ltd. The pore diameter of the inorganic mesoporous material was measured using a transmission electron microscope of model JEM-2100 manufactured by JEOL Ltd. The fluorescence intensity was measured using a fluorescence spectrometer of model F-380 manufactured by Tianjin Gangdong Technology Co., Ltd.

Example 1

Figure 2:
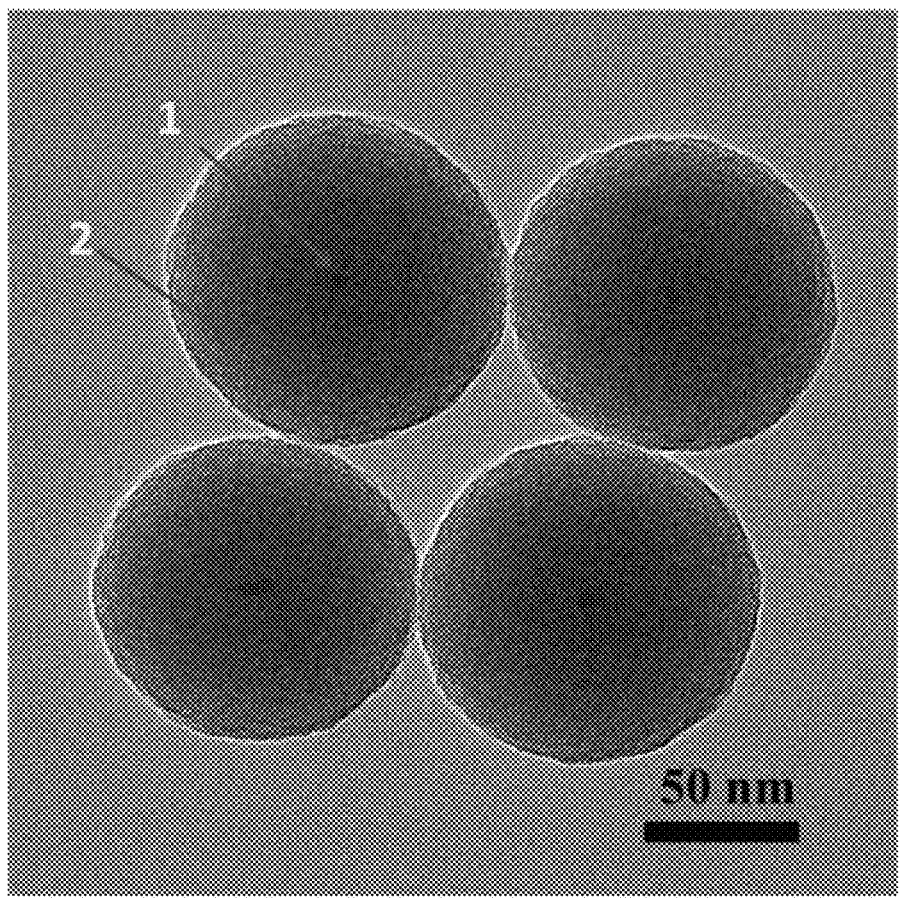
FIG. 2 is a transmission electron microscope photograph of quantum dot core/mesoporous silicon dioxide nanocomposite particles prepared in Example 1, where 1 is a quantum dot core and 2 is a silicon dioxide layer.

In a 50 mL hydrosol containing 0.05 g of CdSe/ZnS fluorescent quantum dot core (the average particle size of the primary particles was about 3 nm), 0.5 mL of tetraethyl orthosilicate was added, stirred and mixed uniformly. 0.1 mL of ammonia water was added to the obtained colloidal solution, and stirred for 0.5 hours. Then, the colloidal solution was heated and stirred at 80° C. until a mesoporous silicon dioxide shell layer was formed on the surface of CdSe/ZnS fluorescent quantum dot core to obtain quantum dot core/mesoporous silicon dioxide composite particles. A transmission electron microscope photograph of the obtained particles is shown in FIG. 2. It can be seen from FIG. 2 that the obtained particles had a core-shell structure, the thickness of the outer shell layer (i.e., the mesoporous silicon dioxide layer) was about 50 nm, and the average pore diameter of the mesopores was about 2 nm.

The obtained quantum dot core/mesoporous silicon dioxide composite particles were precipitated by ethanol and redispersed to form a hydrosol. Then, 0.3 mL of 3-(mercaptopropyl) trimethoxysilane was added to the hydrosol, stirred and mixed uniformly under heating at 80° C. to obtain a hydrosol of thiol-modified quantum dot core/mesoporous silicon dioxide nano composite particles.

0.01 g of methyl acrylate was mixed with a 5 mL aqueous solution containing 0.02 g of rhodamine 6G organic fluorescent dye to obtain a methyl acrylate-treated organic fluorescent dye solution. A hydrosol of thiol-modified quantum dot core/mesoporous silicon dioxide nanocomposite particles was mixed with the methyl acrylate-treated organic fluorescent dye solution, and cured under the irradiation of 320 to 360 nm ultraviolet light to achieve a click chemical reaction, thereby introducing the organic fluorescent dye rhodamine 6G into the mesoporous channels. After high-speed centrifugation, the quantum dot core/mesoporous silicon dioxide/fluorescent responsive molecule nanocomposite particles filled with fluorescent dye molecules were obtained.

Example 2

Figure 3:
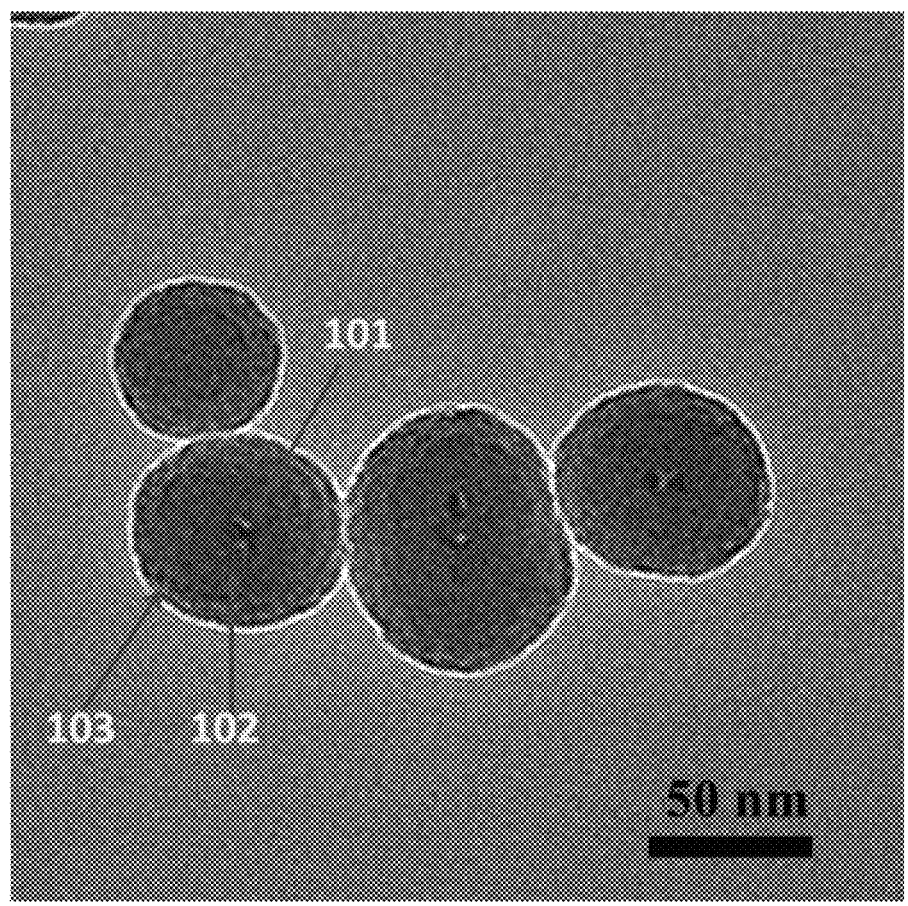
FIG. 3 is a transmission electron microscope photograph of quantum dot core/mesoporous silicon dioxide/fluorescent responsive substance/aluminum oxide nanocomposite particles prepared in Example 2, where 101 is a quantum dot core, 102 is a silicon dioxide layer, and 103 is an aluminum oxide layer.

To the mixture obtained by the reaction of irradiation with ultraviolet light in Example 1, 10 mL aqueous solution of 0.5 g aluminosilicate was added, and 0.5 mL 35% aqueous ammonia solution was added. The reaction was carried out under stirring at 100° C., and a white precipitate was observed, thus the quantum dot core/mesoporous silicon dioxide/fluorescent responsive substance/aluminum oxide nanocomposite particles were obtained with light-transmitting metal aluminum oxide as a passivation layer. A transmission electron microscope photograph of the particles is shown in FIG. 3. It can be seen from FIG. 3 that the thickness of the outermost layer 3 was about 2 to 6 nm and should be an aluminum oxide layer.

Under 450 nm blue light irradiation (0.5 w/cm2), the fluorescence intensities of hydrosol of quantum dot core, hydrosol of quantum dot core/mesoporous silicon dioxide nanocomposite particles, hydrosol of quantum dot core/mesoporous silicon dioxide/fluorescent responsive substance nanocomposite particles, and hydrosol of quantum dot core/mesoporous silicon dioxide/fluorescent responsive substance/aluminum oxide nanocomposite involved in Examples 1 and 2 over time were measured.

Figure 4:
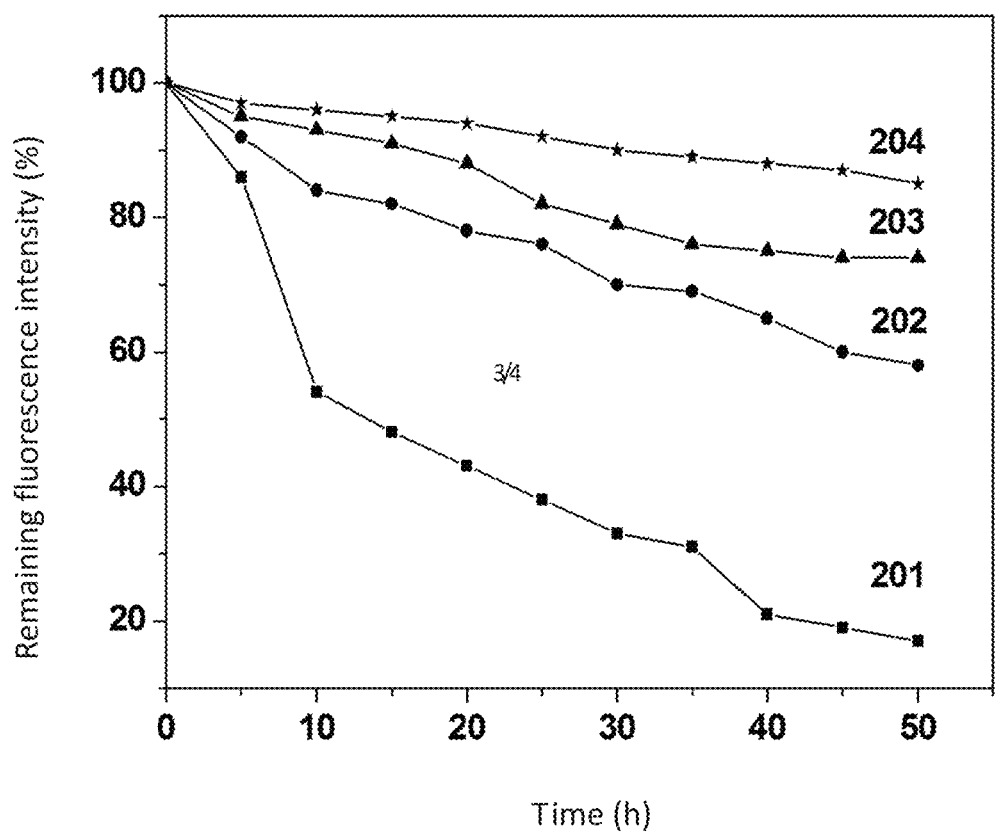
FIG. 4 is a graph showing changes over time in fluorescence intensity of each of a hydrosol of quantum dot cores, a hydrosol of quantum dot core/mesoporous silicon dioxide nanocomposite particles, a hydrosol of quantum dot core/mesoporous silicon dioxide/fluorescent responsive substance nanocomposite particles, and a hydrosol of quantum dot core/mesoporous silicon dioxide/fluorescent responsive substance/aluminum oxide nanocomposite particles, respectively, wherein
    201—fluorescence intensity changing curve of the hydrosol of quantum dot cores;
    202—fluorescence intensity changing curve of the hydrosol of quantum dot core/mesoporous silicon dioxide nanocomposite particles;
    203—fluorescence intensity changing curve of the hydrosol of quantum dot core/mesoporous silicon dioxide/fluorescent responsive substance nanocomposite particles; and
    204—fluorescence intensity changing curve of the hydrosol of quantum dot core/mesoporous silicon dioxide/fluorescent responsive substance/aluminum oxide nanocomposite particles.

It can be seen from FIG. 4 that the fluorescent stability of the quantum dot core/mesoporous silicon dioxide/fluorescent responsive substance nanocomposite particles was significantly higher than that of the quantum dot core/mesoporous silicon dioxide nanocomposite particles. The fluorescent stability was further improved when the quantum dot core/mesoporous silicon substance/aluminum responsive substance nanocomposite particles was further coated with an aluminum oxide layer.

What is claimed is:

1. A core-shell type quantum dot comprising a quantum dot core, a light-transmitting inorganic mesoporous material layer on a surface of the quantum dot core, and a filler different from the inorganic mesoporous material in mesopores of the light-transmitting inorganic mesoporous material layer,
wherein the filler is a fluorescent-responsive substance, and
wherein the fluorescent responsive substance is one or more substances selected from the group consisting of $NaYF_4$, $NaLuF_4$, $NaGdF_4$, $NaYbF_4$ nanoparticles, $NaYF_4$, $NaLuF_4$, $NaGdF_4$, $NaYbF_4$ nanoparticles doped with one or more rare earth ions selected from $Yb^{3+}$, $Er^{3+}$, $Tm^{3+}$, and $Ho^{3+}$, fluorescein isothiocyanic acid, phycoerythrin, AlexaFluor series dyes, rhodamine series dyes, and compounds and conjugated polymers containing a benzene ring or a heterocyclic ring and conjugated double bonds.

2. The core-shell type quantum dot according to claim 1, wherein the filler is fixed in the mesopores by chemical bonding.

3. The core-shell type quantum dot according to claim 1, wherein the core-shell type quantum dot further comprises a light-transmitting metal oxide passivation layer on a surface of the light-transmitting inorganic mesoporous material layer away from the quantum dot core.

4. The core-shell type quantum dot according to claim 3, wherein the oxide constituting the light-transmitting metal oxide passivation layer is one or more substances selected from the group consisting of aluminum oxide, magnesium oxide, zinc oxide, magnesium aluminum oxide, zinc aluminum oxide, and magnesium zinc oxide.

5. The core-shell type quantum dot according to claim 1, wherein the core-shell type quantum dot meets at least one of i) the thickness of the light-transmitting inorganic mesoporous material layer is about 2 to 50 nm, ii) the thickness of the light-transmitting metal oxide passivation layer is about 1 to 10 nm, and iii) the total coating thickness of the quantum dot core is about 3 to 60 nm.

6. A method for preparing the core-shell type quantum dot according to claim 1, comprising:

a) introducing a light-transmitting inorganic mesoporous material layer on a surface of the quantum dot core to obtain quantum dot core/inorganic mesoporous material composite particles; and b) introducing a filler different from the inorganic mesoporous material into mesopores of the inorganic mesoporous material layer of the quantum dot core/inorganic mesoporous material composite particles obtained in step a) to obtain quantum dot core/inorganic mesoporous material/filler composite particles.

7. The method according to claim 6, wherein step b) comprises steps 2)-4):

2) Modifying mesoporous channels of the inorganic mesoporous material layer of the quantum dot core/inorganic mesoporous material composite particles obtained in step a) with a compound containing functional group X to obtain functional group X-modified quantum dot core/inorganic mesoporous material composite particles;

3) Modifying the filler different from the inorganic mesoporous material with a compound containing functional group Y to obtain a functional group Y-modified filler, wherein the functional group X and the functional group Y are reactive with each other; and 4) contacting the functional group X-modified quantum dot core/inorganic mesoporous material composite particles obtained in step 2) with the functional group Y-modified filler obtained in step 3), thus reacting the functional group X with the functional group Y to obtain quantum dot core/inorganic mesoporous material/filler composite particles.

8. The method according to claim 6, further comprising:

c) coating the surface of the quantum dot core/inorganic mesoporous material/filler composite particles obtained in step b) or step 4) with a light-transmitting metal oxide passivation layer.

9. The method according to claim 7, wherein when the functional group X is conjugated double bonds or a three-atom-four-electron conjugated system moiety, the functional group Y is a carbon-carbon double bond, a derivative of carbon-carbon double bond structure, a carbon-carbon triple bond, or a derivative of carbon-carbon triple bond structure; and wherein when the functional group X is a mercapto group, the functional group Y is a carbon-carbon double bond or a derivative of carbon-carbon double bond structure.

10. The method according to claim 7, wherein the compound containing functional group X used in step 2) and the compound containing functional group Y used in step 3) are compounds capable of undergoing Diels-Alder reaction, thio-ene reaction, or Huisgen cycloaddition reaction with each other.

11. The method according to claim 7, wherein the compound containing functional group X used in step 2) and the compound containing functional group Y used in step 3) are each as follows:

1) The compound containing functional group X used in step 2) is a conjugated diene compound capable of undergoing Diels-Alder addition reaction, and the compound containing functional group Y used in step 3) is a dienophile compound capable of undergoing Diels-Alder addition reaction;

2) The compound containing functional group X used in step 2) is a thiol compound capable of undergoing thio-ene addition reaction, and the compound containing functional group Y used in step 3) is a compound containing a carbon-carbon double bond capable of undergoing thio-ene addition reaction; and 3) The compound containing functional group X used in step 2) is a 1,3-dipole capable of undergoing Huisgen cycloaddition reaction, and the compound containing functional group Y used in step 3) is an alkene, an alkyne or a derivative thereof capable of undergoing Huisgen cycloaddition reaction.

12. An electroluminescent or photoluminescent device comprising a light emitting layer comprising the core-shell type quantum dot according to claim 1.

* * * * *

UNITED STATES PATENT AND TRADEMARK OFFICE
CERTIFICATE OF CORRECTION

PATENT NO. : 11,746,286 B2
APPLICATION NO. : 16/640172
DATED : September 5, 2023
INVENTOR(S) : Aidi Zhang It is certified that error appears in the above-identified patent and that said Letters Patent is hereby corrected as shown below:

In the Specification

Column 6, Line 43, delete "CuInSe, PbS" and insert therefor -- CuInSe, PbS --.
Column 6, Line 46, delete "CuInSe/ZnS" and insert therefor -- CuInSe/ZnS --.

In the Claims

In Claim 7, Column 15, Line 13, delete "2) Modifying" and insert therefor -- 2) modifying --.
In Claim 7, Column 15, Line 20, delete "3) Modifying" and insert therefor -- 3) modifying --.
In Claim 11, Column 16, Line 17, delete "1) The compound" and insert therefor -- 1) the compound --.
In Claim 11, Column 16, Line 23, delete "2) The compound" and insert therefor -- 2) the compound --.
In Claim 11, Column 16, Line 29, delete "3) The compound" and insert therefor -- 3) the compound --.

Signed and Sealed this
Seventh Day of November, 2023

Katherine Kelly Vidal
*Director of the United States Patent and Trademark Office*